(12) United States Patent
Lee

(10) Patent No.: US 12,670,732 B2
(45) Date of Patent: Jun. 30, 2026

(54) DRIVER RECOGNITION SYSTEM AND METHOD OF USE THEREOF

(71) Applicant: HYUNDAI MOBIS CO., LTD., Seoul (KR)

(72) Inventor: Jae Young Lee, Icheon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 314 days.

(21) Appl. No.: 18/493,256

(22) Filed: Oct. 24, 2023

(65) Prior Publication Data

US 2024/0185621 A1 Jun. 6, 2024

(30) Foreign Application Priority Data

Dec. 5, 2022 (KR) ........................ 10-2022-0167599

(51) Int. Cl.
*G06V 20/59* (2022.01)
*B60W 40/08* (2012.01)
(Continued)

(52) U.S. Cl.
CPC ........... *G06V 20/597* (2022.01); *B60W 40/08* (2013.01); *B60W 50/0098* (2013.01); *G06V 10/25* (2022.01); *G06V 10/70* (2022.01); *G06V 40/172* (2022.01); *B60W 2040/0809* (2013.01); *B60W 2050/0083* (2013.01);
(Continued)

(58) Field of Classification Search
CPC ...... G06V 20/597; G06V 10/25; G06V 10/70; G06V 40/172; G06V 10/141; G06V 10/20; G06V 10/761; G06V 10/774; G06V 20/59; G06V 40/171; G06V 40/50;

B60W 40/08; B60W 50/0098; B60W 2040/0809; B60W 2050/0083; B60W 2420/403; B60W 2540/043; B60W 2556/10; B60K 2360/176; B60K 2360/21; B60K 2360/48; B60K 2360/741; B60K 35/10; B60K 35/654;
(Continued)

(56) References Cited

U.S. PATENT DOCUMENTS 11,498,500 B1 * 11/2022 Pertsel ................. G06V 40/103
2005/0147291 A1 * 7/2005 Huang ................. G06V 40/172
382/218
(Continued)

FOREIGN PATENT DOCUMENTS

KR 10-2020-0095168 A 8/2020

OTHER PUBLICATIONS

Dias Da Cruz et al., "SVIRO: Synthetic Vehicle Interior Rear Seat Occupancy Dataset and Benchmark", arXiv:2001.03483v1 (Year: 2020).*
(Continued)

*Primary Examiner* — Vu Le
*Assistant Examiner* — Rachel Anne Ometz
(74) *Attorney, Agent, or Firm* — NovoTechIP International PLLC

(57) ABSTRACT

A system and method are provided for automatically extracting image data of a driver's face when a driver sits in a driver's seat and then starting an engine of a vehicle, based on determining whether the extracted face matches a pre-registered face, and automatically controlling a vehicle environment based on the matched face data, thereby maximizing the convenience of using the vehicle.

19 Claims, 3 Drawing Sheets

(51) Int. Cl.

| | |
|---|---|
| *B60W 50/00* | (2006.01) |
| *G06V 10/25* | (2022.01) |
| *G06V 10/70* | (2022.01) |
| *G06V 40/16* | (2022.01) |

(52) U.S. Cl.
CPC . *B60W 2420/403* (2013.01); *B60W 2540/043* (2020.02); *B60W 2556/10* (2020.02)

(58) Field of Classification Search
CPC .......... B60Y 2400/3015; B60R 16/037; G06N 20/00; G06T 2207/30268; G06T 2210/12
See application file for complete search history.

(56) References Cited

U.S. PATENT DOCUMENTS

| | | | | |
|---|---|---|---|---|
| 2017/0351905 | A1* | 12/2017 | Wang ................... | G06V 40/172 |
| 2020/0324784 | A1* | 10/2020 | Liang ..................... | G06V 40/16 |
| 2021/0397820 | A1* | 12/2021 | Wu ...................... | G06V 40/172 |

OTHER PUBLICATIONS

Jaworek-Korjakowska et al., "SafeSO: Interpretable and Explainable Deep Learning Approach for Seat Occupancy Classification in Vehicle Interior," 2021 IEEE/CVF Conference on Computer Vision and Pattern Recognition Workshops (CVPRW), Nashville, TN, USA, 2021, pp. 103-112 (Year: 2021).*

* cited by examiner

DRIVER RECOGNITION SYSTEM AND METHOD OF USE THEREOF

CROSS-REFERENCE TO RELATED APPLICATIONS

This application claims priority under 35 U.S.C. § 119 to Korean Patent Application No. 10-2022-0167599, filed on Dec. 5, 2022, in the Korean Intellectual Property Office, the disclosure of which is incorporated herein by reference in its entirety.

TECHNICAL FIELD

The following disclosure relates to a driver recognition system and method thereof, and more particularly, to a driver recognition system and method thereof designed to improve facial recognition performance of a driver seated in a driver's seat in order to provide individual vehicle setting items previously set by the driver with high accuracy.

BACKGROUND

Car sharing is one of the representative sharing economy systems as a method of renting and using a vehicle.

There are two basic types of car sharing, specifically: peer to peer (P2P), in which sharing is performed between individuals; and business to consumer (B2C), in which a company provides shared vehicles to users.

In the case of the P2P, Uber, Carpool World, Relay Rise, etc., provide a platform to find passengers with the same or similar destinations, or lend vehicles you own to other persons during the time you are not using the vehicles.

In the case of the B2C, companies such as Green Car, Zipcar, and Car2Go secure multiple vehicles and bases and provide car use services on a part-time basis.

Such car sharing has good accessibility because it is possible to rent vehicles in a nearby garage, and high autonomy because it is possible to drive the rented vehicle freely. In addition, since there is no obligation to return a car within a certain time, the car sharing has good convenience and costs less than owning a car. In particular, since the car sharing has the effect of reducing mileage by 8,900 km and fuel consumption by 8301 yearly per user, it is attracting attention as one of the eco-friendly transportation means.

Recently, a controller mounted on a vehicle can be set specialized for an individual (driver, passenger, etc.). For example, a vehicle equipped with a high-end sound system may adjust a three-dimensional position and frequency of sound output according to a seat position, and a seat position and positions of side mirrors may also be adjusted to suit a driver.

However, in the above-described car sharing environment, since a vehicle to be used is set to suit a user who has previously used the vehicle, it takes time to change the setting to suit a driver to use, resulting in inconvenience.

Of course, a deep learning network may be used in a vehicle for driver recognition, but in this case, since interior designs of each vehicle are different, there is a problem in that a lot of cost is required to construct a learning data set. In other words, recognizing something is based on the difference between the background and the foreground. Since interior designs of each vehicle model are different, excessive costs are naturally incurred in generating data sets for each vehicle model.

In addition, when applied to a car sharing environment, if 5 drivers are registered, it is too little data to distinguish 5 drivers from the point of view of the deep learning network. As a result, the recognizer itself is overfitting.

Literally, since the registered driver image data itself is learned as it is, when the driver wears glasses or a hat, unlike when the driver was registered, a problem of not recognizing the driver occurs.

Conventionally published technologies provide a vehicle sharing service and propose a technology of changing vehicle status information based on user setting information, but register a device and a vehicle and then determine what kind of user is by an authentication process through a device. However, conventionally, technologies for recognizing a face of a driver seated in a driver's seat and recognizing whether the driver is a registered driver have not been disclosed.

SUMMARY

An embodiment of the present disclosure is directed to providing a driver recognition system and method thereof capable of extracting a face of a driver seated in a driver's seat to recognize whether the driver is a registered driver.

In particular, another embodiment of the present disclosure is directed to providing a driver recognition technology optimized for each vehicle based on a learning data transfer technique using a balanced open data set and a small number of custom data sets acquired for each vehicle.

In one general aspect, a driver recognition system includes: a driver input unit that receives image data of a driver seated in a driver's seat in a vehicle in which an automatic driver recognition function is set; a driver area extraction unit configured to extract driver's head area data by analyzing the image data of the driver using a stored machine learning-based object detection model; a driver determination unit that analyzes the extracted head region data and the registered driver's head area data using a stored machine learning-based driver matching model, and determines whether there is matched data; and a driver recognition unit that extracts unique information matched to the corresponding head region data when it is determined that there is the matched data according to the determination result of the driver determination unit, and performs an automatic driver recognition function using the extracted unique information.

The driver recognition unit may perform an automatic driver recognition function for controlling a state of the vehicle according to the vehicle setting information previously received from the driver matching the unique information using the extracted unique information.

The driver recognition system may further include: a registered driver collection unit that acquires the image data of the driver when a driver who wants to use a vehicle in which an automatic driver recognition function is set in advance sits in the driver's seat; a registered driver area extraction unit configured to extract driver's head area data by analyzing the image data of the driver using a stored machine learning-based object detection model; a vehicle setting input unit that receives desired vehicle setting information from a corresponding driver; and a registered driver management unit that generates unique information for each driver, and matches the unique information generated for each driver, the head area data extracted by the registered driver area extraction unit, and the setting information received by the vehicle setting input unit to store and manage the matched information, in which the driver determination unit may receive head area data stored and managed by the registered driver management unit as head area data of the registered driver.

The registered driver collection unit may repeatedly perform the operation for a predetermined number of times, request the driver to change a head angle for each operation, and acquire the image data of the driver.

The driver recognition system may further include: a first image collection unit that acquires a first image data set, which is image data of a driver's seat, in a driverless situation for each illumination controlled according to a predetermined condition, for each vehicle model for which the automatic driver recognition function is to be set in advance; a second image collection unit that seats a driver, to which unique information is assigned, in the driver's seat, for each vehicle model for which the automatic driver recognition function is to be set in advance and then requests to change the head angle by a predetermined number of times, and acquires a second image data set which is the image data of the driver's seat; a custom data generation unit that analyzes the second image data set by the second image collection unit to perform labeling on the head area, and generates a custom data set including corresponding image data and labeling coordinate information based on each piece of unique information; a region of interest setting unit that overlaps all labeling areas constituting the custom data set and setting the entire overlapping area as a region of interest (ROI); and an anchor box setting unit that sets the region of interest to a predetermined number of anchor box areas based on an average size value and an average ratio value of all the labeling areas constituting the custom data set.

The driver recognition system may further include: an input data selection unit that selects at least one data set from among an open data set pre-collected based on a probability and a stored custom data set; a data pre-processing unit that extracts a predetermined number of anchor box areas set by the anchor box setting unit for each data constituting the data set selected by the input data selection unit; and a learning processing unit that inputs each anchor box area-based data extracted by the data pre-processing unit to a pre-stored object detection network and performs learning processing to generate, store, and transmit an object detection model, in which the data pre-processing unit may extract the predetermined number of anchor box areas set by the anchor box setting unit for each data constituting the custom data set when a custom data set is selected by the input data selection unit.

The data pre-processing unit may further include: when the open data set is selected by the input data selection unit, a 2-1-th pre-processing unit that detects head area data for each data constituting the open data set by using the pre-stored object detection model; a 2-2-th pre-processing unit that randomly adjusts at least one of hue, saturation, brightness, and transparency of the head area data detected by the 2-1-th pre-processing unit; a 2-3-th pre-processing unit that randomly receives at least one image data of the first image data by the first image collection unit, and positions the head area data by the 2-2-th pre-processing unit in the corresponding image data to generate a synthetic data set, and positions the head area data in region of interest coordinates set by the region of interest setting unit; and a 2-4-th pre-processing unit that extracts the predetermined number of anchor box areas set by the anchor box setting unit for each data constituting the synthetic data set.

The driver recognition system may further include: a feature pre-processing unit that analyzes, in advance, a custom data set generated by the custom data generation unit and a synthetic data set generated by the 2-3-th pre-processing unit by using the object detection model generated by the learning processing unit to extract face area data from each image data, and assigns the unique information to each extracted face area data; a first learning processing unit that inputs the face area data to which the unique information is assigned by the feature pre-processing unit to a pre-stored classification network to perform learning processing; a feature extraction unit that uses at least two feature extraction networks including a base network in which a learning result of the first learning processing unit is reflected to input the face area data to which the unique information is assigned by the feature pre-processing unit to any one selected feature extraction network and input the face area data corresponding to the custom data set among the face area data to which the unique information is assigned by the feature pre-processing unit to another feature extraction network, and extracts features of the face area data input from each network; and a second learning processing unit that includes a feature comparator layer connected to rear ends of the two feature extraction networks to compare the features of each face area data extracted by the feature extraction unit and perform the learning processing of determining whether the features are identical, in which a final layer constituting the base network of the classification network of the first learning processing unit may be composed of a global average pooling (GAP) layer, the final layer constituting each base network of the two feature extraction networks of the second learning processing unit may be composed of an adaptive average pooling (AAP) layer, and the driver matching model may be generated as a learning processing result of the second learning processing unit.

In another general aspect, a driver recognition method using a driver recognition system in which each step is performed by an arithmetic processing means includes: a first image collection step (S100) of acquiring a first image data set, which is image data of a driver, in a driverless situation for each illumination controlled according to a predetermined condition, for each vehicle model for which the automatic driver recognition function is to be set; a second image collection step (S200) of seating a driver to which unique information is assigned in the driver's seat, for each vehicle model for which the automatic driver recognition function is to be set and then requesting to change the head angle by a predetermined number of times, and acquiring a second image data set which is the image data of the driver; a custom data generation step (S300) of analyzing the second image data set by the second image collection step (S200) to perform labeling on the head area, and generating a custom data set including corresponding image data and labeling coordinate information based on each piece of unique information; a region of interest setting step (S400) of overlapping all labeling areas constituting the custom data set by the custom data generation step (S300) and setting the entire overlapping area as a region of interest (ROI); an anchor box setting step (S500) of setting the region of interest to a predetermined number of anchor box areas based on an average size value and an average ratio value of all the labeling areas constituting the custom data set by the custom data generation step (S300); a data pre-processing step (S600) of selecting at least one data set from among an open data set pre-collected based on a probability and a stored custom data set and extracting a predetermined number of anchor box areas set by the anchor box setting step (S500) for each data constituting the selected data set; a first learning processing step (S700) of inputting each anchor box area-based data extracted by the data pre-processing step (S600) to a pre-stored object detection network and performing learning processing to generate an object detection model; a driver input step (S800) of receiving image data of a driver seated in a driver's seat in a vehicle in which an automatic driver recognition function is set; a driver area extraction step (S900) of extracting the driver's head area data by analyzing the image data of the driver by the driver input step (S800) using the object detection model generated by the first learning processing step (S700); a driver determination step (S1000) of analyzing the extracted head region data and the pre-registered driver's head area data by the driver area extraction step (S900) using a stored machine learning-based driver matching model, and determines whether there is matched data; and a driver recognition step (S1100) of extracting unique information matched to the corresponding head region data when it is determined that there is the matched data according to the determination result of the driver determination step (S1000), and performs an automatic driver recognition function using the extracted unique information, in which the driver recognition step (S1100) may use the extracted unique information to control state of the vehicle according to the vehicle setting information previously received from the driver matching the unique information.

The data pre-processing step (S600) may include a first pre-processing step (S610) of extracting a predetermined number of anchor box areas set by the anchor box setting step (S500) for each data constituting the custom data set when a custom data set is selected.

The data pre-processing step (S600) may further include: when the open data set is selected, a 2-1-th pre-processing step (S621) of detecting head area data for each data constituting the open data set by using the pre-stored object detection model; a 2-2-th pre-processing step (S622) of randomly adjusting at least one of hue, saturation, brightness, and transparency of the head area data detected by the 2-1-th pre-processing step (S621); a 2-3-th pre-processing step (S623) of randomly receiving at least one image data of the first image data set by the first image collection step (S100), and positions the head area data by the 2-2-th pre-processing step (S622) in the corresponding image data to generate a synthetic data set, and randomly positions the head area data in region of interest coordinates set by the region of interest setting step (S400); and a 2-4-th pre-processing step (S624) of extracting the predetermined number of anchor box areas set by the anchor box setting step (S500) for each data constituting the synthetic data set.

The driver recognition method may further include: prior to performing the driver determination step (S1000) in order to store a machine learning-based driver matching model, a feature pre-processing step (S10) of analyzing, in advance, a custom data set generated by the custom data generation step (S300) and a synthetic data set generated by the 2-3-th pre-processing step (S623) by using the object detection model generated by the first learning processing step (S700) to extract face area data from each image data, and assigning the unique information to each extracted face area data; a second learning processing step (S20) of inputting the face area data to which the unique information is assigned by the feature pre-processing step (S10) to a pre-stored classification network to perform learning processing; a feature extraction step (S30) of using at least two feature extraction networks including a base network in which a learning result of the second learning processing step (S20) is reflected to input the face area data to which the unique information is assigned by the feature pre-processing step (S10) to any one selected feature extraction network and input the face area data corresponding to the custom data set among the face area data to which the unique information is assigned by the feature pre-processing step (S10) to another feature extraction network, and extracting features from each network; and a third learning processing step (S40) of comparing the features of each face area data extracted by the feature extraction step (S30) by including a feature comparator layer connected to rear ends of the two feature extraction networks to perform the learning processing of determining whether the features are identical, in which a final layer constituting the base network of the classification network may be composed of a global average pooling (GAP) layer, the final layer constituting the base network of the feature extraction network may be composed of an adaptive average pooling (AAP) layer, and the driver matching model may be generated as a learning processing result of the third learning process step (S40).

The driver recognition method may further include: prior to performing, in advance, the driver determination step (S1000) in order to register the head area data, a registered driver collection step (S50) of acquiring the image data of the driver when a driver who wants to use a vehicle in which an automatic driver recognition function is set sits in the driver's seat; a driver area extraction step (S60) of extracting the driver's head area data by analyzing the image data of the driver by the registered driver collection step (S50) using the object detection model generated by the first learning processing step (S700); a vehicle setting input unit (S70) of receiving desired vehicle setting information from a corresponding driver; and a registered driver management step (S80) of generating unique information for each driver, and matching the unique information generated for each driver, the head area data extracted by the registered driver area extraction step (S60), and the setting information received by the vehicle setting input step (S70) to store and manage the matched information, in which the registered driver collection step (S50) may request the driver to change a head angle for each operation and acquire the image data of the driver while repeatedly performing the operation for a predetermined number of times.

DETAILED DESCRIPTION

Figure 1:
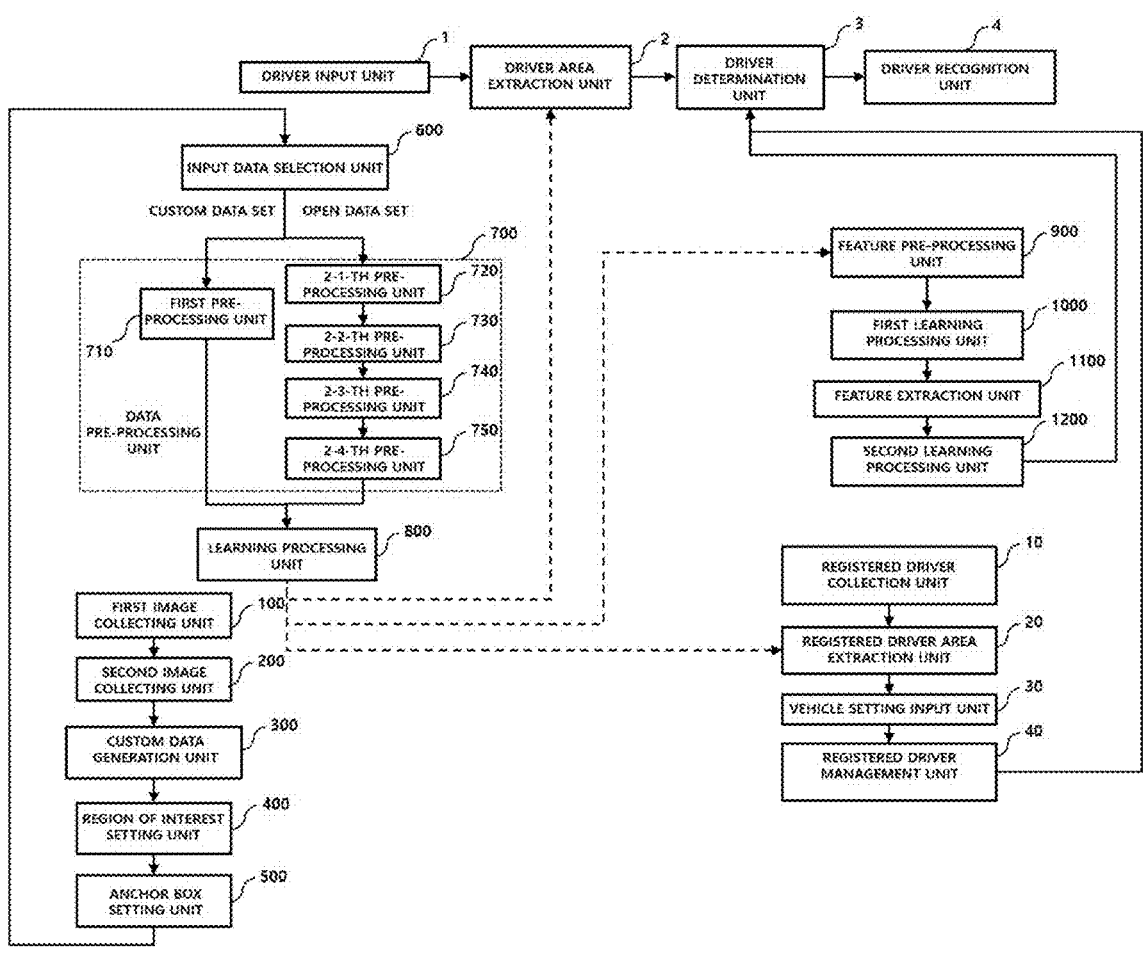
FIG. 1 is an exemplary configuration diagram illustrating a driver recognition system according to an embodiment of the present disclosure.

The above-described objects, features, and advantages of the present disclosure will become more obvious from the following detailed description provided in relation to the accompanying drawings. The following specific structural or functional descriptions are only exemplified for the purpose of explaining the embodiments according to the concept of the present disclosure, and the embodiments according to the concept of the present disclosure may be implemented in various forms and should not be construed as limited to the embodiments described herein or in the application. Since embodiments according to the concept of the present disclosure may be variously modified and may have several forms, specific embodiments will be illustrated in the accompanying drawings and will be described in detail in the present specification or application. However, it is to be understood that the present disclosure is not limited to specific embodiments, but includes all modifications, equivalents, and substitutions falling in the spirit and the scope of the present disclosure. Terms such as first, second, or the like, may be used to describe various components, but these components are not to be construed as being limited to these terms. The terms are used only to distinguish one component from another component. For example, a first component may be named a second component and the second component may also be named the first component, without departing from the scope of the present disclosure. It is to be understood that when one component is referred to as being connected to or coupled to another component, it may be connected directly to or coupled directly to another component or be connected to or coupled to another component with the other component interposed therebetween. On the other hand, it is to be understood that when one component is referred to as being connected directly to or coupled directly to another component, it may be connected to or coupled to another component without the other component interposed therebetween. Other expressions describing a relationship between components, that is, "between," "~directly between," "~neighboring to," "~directly neighboring to," and the like, should be similarly interpreted. Terms used in the present specification are used only in order to describe specific embodiments rather than limiting the present disclosure. Singular forms are intended to include plural forms unless the context clearly indicates otherwise. It is to be understood that terms ?include?, ?have?, or the like, used in the present specification specify the presence of features, numerals, steps, operations, components, parts, or a combination thereof described in the present specification, but do not preclude the presence or addition of one or more other features, numerals, steps, operations, components, parts, or a combination thereof. Unless indicated otherwise, it is to be understood that all the terms used in the specification including technical and scientific terms have the same meaning as those that are generally understood by those who skilled in the art. Terms generally used and defined in a dictionary are to be interpreted as the same meanings with meanings within the context of the related art, and are not to be interpreted as ideal or excessively formal meanings unless clearly indicated in the present specification. Hereinafter, exemplary embodiments of the present disclosure will be described in detail with reference to the accompanying drawings. Like reference numerals proposed in each drawing denote like components.

In addition, a system means a set of components including devices, mechanisms, means, and the like, systematized in order to perform required functions and regularly interacting with one another.

A driver recognition system and method thereof according to an embodiment of the present disclosure collects image data without a driver (passenger seated in a driver's seat) for each vehicle model to set an automatic driver recognition function through a driver monitoring system mounted on a vehicle in advance and image data obtained by changing a head and posture of a number of drivers recruited in advance to generate a data set for the vehicle model while the drivers sitting in the driver's seat, thereby performing labeling of a head area.

The learning processing of the labeled head area is performed using an object detection network, and then the driver's head area is detected from the input image data.

In this case, in order to reduce the amount of calculation of the object detection network, a predetermined number of anchor boxes set to a single size and a single ratio are set based on the fact that the position of the head does not change significantly while driving after the driver sits in the driver's seat, and then the learning is performed only on the anchor box to detect the head area.

In addition, as described above, since it is practically impossible to construct a sufficient data set for network learning for each vehicle model for setting the automatic driver recognition function using the open data set, a head area included in an open data set is detected, and the hue, transparency, brightness, saturation, etc., of the head area are randomly adjusted to be synthesized with image data without a driver, and the synthesized position is also randomly positioned based on the anchor box and used as a data set, so it is possible to improve object recognition generalization performance while being suitable for a specific vehicle (for each vehicle model for setting the automatic driver recognition function).

In addition, in order to match two face images, in other words, to determine whether a face extracted from image data is the same person as a face extracted from pre-registered image data, a classification network is learned to extract general features by using a data set without deformable convolution-based pre-processing.

Thereafter, the base network of the finally learned learning model is transferred except for the final layer, and a driver matching network is learned.

In this case, the final layer of the base network is designed to compare and determine whether face images having various sizes are identical in a feature comparator by changing a global average pooling (GAP) layer of the classification network to an adaptive average pooling (AAP) layer to output features having a specific fixed size.

In this way, the driver matching network is learned to extract and compare features advantageous to driver matching without losing generality.

After the development of the learning model is completed and mounted on the vehicle, when a driver gets into a vehicle, a head area of a current driver is extracted using the object detection model and then registered.

Thereafter, when the driver gets into the vehicle, after extracting the current driver's head area with the object recognition network, using the driver matching model, it is determined whether there is the same data as the extracted head area image data among the pre-registered head area image data.

When there is the same data, user setting menu (USM) setting values such as seat setting, side mirror setting, and sound setting set in advance by the driver of the corresponding data are fetched and applied.

According to the driver recognition system and method thereof according to an embodiment of the present disclosure, it is possible to not only reduce costs of generating learning data by transferring and using an open data set without generating a data set specialized for learning of a deep learning network for each vehicle, but also improve recognition performance.

In addition, by minimizing the pre-processing, it is possible to shorten the calculation time.

In addition, there is an advantage in that the recognition performance can be further improved by performing feature comparison after abstracting the estimated features.

FIG. 1 illustrates a configuration diagram of a driver recognition system according to an embodiment of the present disclosure.

As illustrated in FIG. 1, the driver recognition system according to an embodiment of the present disclosure may include a driver input unit 1, a driver area extraction unit 2, a driver determination unit 3, and a driver recognition unit 4. Each component preferably performs an operation through arithmetic processing means including a computer, and as described above, performs an operation an arithmetic processing means such as an ECU including a computer performing transmission and reception through an in-vehicle communication channel.

After the driver input unit 1, the driver area extraction unit 2, the driver determination unit 3, and the driver recognition unit 4 are components that performs operations after mass-produced while mounted on a vehicle after the learning of the object detection model and the driver matching model constituting the driver recognition system are completed.

Each component will be described in detail.

The driver input unit 1 receives image data of a driver seated in a driver's seat in a vehicle in which an automatic driver recognition function is set.

The driver input unit 1 receives image data of a driver seated in a driver's seat through a driver monitoring system mounted on the vehicle. In this case, the driver monitoring system is a sensor mounted on a room mirror, etc., and is usually used to monitor driver's attention, which is one of the safety assist driving functions, but since automatically recognizing a driver and automatically setting a vehicle environment optimized for each driver (side mirror position, vehicle seat position, sound setting value, user setting menu (USM) value, etc.) is also one of the important safety assist driving functions in a broad sense, it is possible to receive the automatically recognized driver and automatically set vehicle environment from the driver input unit 1.

It is preferable that the driver area extraction unit 2 analyzes the image data of the driver by the driver input unit 1 using the stored machine learning-based object detection model.

In detail, the driver's area extraction unit 2 analyzes the image data of the driver and extracts driver's head area data.

In this case, the learning processing process of the object detection model stored in the driver area extraction unit 2 will be described later in detail.

The driver determination unit 3 analyzes the head area data extracted from the driver area extraction unit 2 and the head area data of the registered driver using the stored machine learning-based driver matching model, and determines whether there is matched data.

In this case, the learning processing process of the driver matching model stored in the driver determination unit 3 will also be described later in detail.

According to the determination result of the driver determination unit 3, the driver recognition unit 4 preferably extracts unique information matching the corresponding head area data when there is the matched data.

In other words, the driver recognition unit 4 extracts the unique information matching the corresponding head area data when there is a registered driver matching the head area data extracted from the driver area extraction unit 2 according to the determination result of the driver determination unit 3, and performs the automatic driver recognition function using the extracted unique information.

Here, the automatic driver recognition function refers to automatically controlling the state of the vehicle according to vehicle setting information (side mirror position, vehicle seat position, sound setting value, user setting menu (USM) value, etc.) previously received from the driver.

Accordingly, the driver recognition unit 4 uses the extracted unique information to control the state of the vehicle according to the vehicle setting information previously received from the driver matching the unique information.

In addition, a user welcome message and sound may be output from the in-vehicle head unit.

As illustrated in FIG. 1, the driver recognition system according to an embodiment of the present disclosure further includes a registered driver collection unit 10, a registered driver area extraction unit 20, a vehicle setting input unit 30, and a registered driver management unit 40, and preferably manages information (image data, vehicle setting information, etc.) of a driver who wants to use a vehicle in which an automatic driver recognition function is set in advance.

In addition, the registered driver collection unit 10, the registered driver area extraction unit 20, the vehicle setting input unit 30, and the registered driver management unit 40 perform operations in a driver registration step after the vehicle is shipped. The driver registration step is performed in a situation where there is no driver registered in the vehicle or in a situation for additional registration. Each component preferably performs an operation through arithmetic processing means including a computer, and as described above, performs an operation an arithmetic processing means such as an ECU including a computer performing transmission and reception through an in-vehicle communication channel.

The registered driver collection unit 10 transmits a driver registration request-related message or the like to a display means in a vehicle or a terminal means possessed by the driver when the driver is seated in a vehicle for which the automatic driver recognition function has been set in advance.

Thereafter, when the received message is transmitted or when a predetermined time has elapsed after the driver is seated, the image data of the driver is acquired.

The image data of the driver is acquired through the driver monitoring system mounted on the vehicle. The driver monitoring system is preferably a sensor mounted on a room mirror or the like.

In this case, it is preferable that the registered driver collection unit 10 requests a driver to change his/her head angle for each operation while repeatedly performing an operation for a predetermined number of time, rather than simply acquiring only frontal image data of a driver's face. In this way, the image data of the driver having various head angles is acquired.

It is preferable that the registered driver area extraction unit 20 analyzes the image data of the driver by the registered driver collection unit 10 using the stored machine learning-based object detection model.

In detail, the registered driver area extraction unit 20 analyzes the image data of the driver and extracts the driver's head area data. In this case, it is preferable that the object detection model used is the same model as the object detection model stored in the driver area extraction unit 2.

It is preferable that the vehicle setting input unit 30 receives desired vehicle setting information (side mirror position, vehicle seat position, sound setting values, various other USM values, etc.) to a corresponding driver, that is, a driver seated in a driver's seat for driver registration.

Since the vehicle setting information is information that can be added/changed as various controllers in the vehicle is developed, the vehicle setting information is not limited thereto.

The registered driver management unit 40 generates unique information (ID, etc.) for each driver, and preferably matches the unique information generated for each driver with the head area data extracted by the registered driver area extraction unit 20 and the setting information input by the vehicle setting input unit 30, makes the matched information into a database, and stores and manages the matched information.

In this way, the driver determination unit 3 receives the head area data stored and managed through the registered driver management unit 40 as the head area data of the registered driver, and determines whether the received head area data matches the head area data extracted through the driver area extraction unit 2.

That is, by managing face data/setting information based on the unique information from a driver who wants to use a vehicle in which the automatic driver recognition function is set, it is used as pre-registered driver information in the driver matching step later.

Based on this, as an example of the driver recognition system according to an embodiment of the present disclosure in a car sharing environment, when five drivers are registered in one vehicle, each driver may have different physical conditions or desired driving sensibility, so the control of the vehicle environment (side mirror position, vehicle seat position, sound setting value, user setting menu (USM) value, etc.) may vary for each driver.

However, when the automatic driver recognition function is not set, the driver should manually set the vehicle environment to the desired control value every time the driver uses the vehicle, which may inevitably increase inconvenience when using the car sharing regularly or periodically.

On the other hand, when the automatic driver recognition function is set through the driver recognition system according to an embodiment of the present disclosure, if the driver starts an engine after seated in the driver's seat, the driver recognition system may automatically extract the driver's face and determine whether the extracted face matches the pre-registered face to automatically control the vehicle environment based on the matched face data, thereby maximizing the use convenience of the vehicle.

To this end, as described above, learning to extract generalized features without overfitting the data in consideration of the fact that not only the accuracy of the object detection model and the driver matching model is improved, but also the amount of data that can be acquired within a limited place such as a vehicle is also limited is the most important technique.

In order to generate an object detection model, as illustrated in FIG. 1, the driver recognition system according to an embodiment of the present disclosure includes a first image collection unit 100, a second image collection unit 200, and a custom data generation unit 300, a region of interest setting unit 400, an anchor box setting unit 500, an input data selection unit 600, a data pre-processing unit 700, and a learning processing unit 800. Each component preferably performs an operation through arithmetic processing means including a computer, and as described above, performs an operation an arithmetic processing means such as an ECU including a computer performing transmission and reception through an in-vehicle communication channel.

In order to improve the generalization performance of the deep learning network, a large number of evenly distributed data is required. However, since generating a large number of evenly distributed data requires high costs, transfer learning, which learns generalized features from existing data and fine-tunes using a small number of application-specificalized data, has been proposed.

The transfer learning has a high probability of overfitting in the fine tuning step using a small number of specialized data, and generalized features learned from the existing data (a large number of data) have low suitability for the application field, resulting in low recognition performance. Therefore, it is difficult for the transfer learning to be an alternative.

In view of this, the driver recognition system according to an embodiment of the present disclosure does not use learned parameters, but simultaneously uses an open data set (for example, CelebA, etc.) and a custom data set to construct learning data suitable for each vehicle to be developed, that is, to be equipped with the automatic driver recognition function.

In this case, since the driver is usually an adult of a certain age or older capable of obtaining a driver's license, the head position, size, and ratio of the driver in the vehicle do not greatly differ. Therefore, by setting an anchor box to a fixed size and a fixed ratio and performing learning processing only on the anchor box area, an object detection network with a low calculation amount is constructed.

In addition, after randomly changing the conditions (hue, saturation, brightness, transparency, etc.) of the head area data extracted from the open data set, by synthesizing the head area data with the interior image data of the vehicle to be developed, the synthetic data set and a small amount of custom data set generated to develop the corresponding vehicle model may be used together to learn the network, thereby generating the model that extracts the generalized feature suitable for the application field.

In detail, it is preferable that the first image collection unit 100 acquires a first image data set, which is image data of a driver's seat, in a driverless situation for each illumination controlled according to a predetermined condition, for each vehicle model for which the automatic driver recognition function is to be set in advance.

In short, the image data of the driver's seat without the driver of the vehicle model to set the automatic driver recognition function is acquired. In this case, considering various external weather conditions applicable to driving, it is preferable to acquire the image data of the driver's seat while controlling illumination.

The first image collection unit 100 acquires the image data of the driver's seat without a driver through a driver monitoring system mounted on a vehicle (vehicle of the vehicle model for which the automatic driver recognition function is to be set).

It is preferable that the second image collection unit 200 seats the driver to which the unique information is assigned in the driver's seat, for each vehicle model for which the automatic driver recognition function is to be set (mounted) in advance and then requests to change the head angle by a predetermined number of times, and acquires the second image data set which is the image data of the driver's seat.

That is, the second image collection unit 200 recruits drivers to generate the custom data set, assigns the unique information to the recruited drivers, gets each driver on the corresponding vehicle (vehicles for each vehicle model for which the automatic driver recognition function is to be set), and then acquires the image data of the driver's seat for each request while requesting the head angle change (head position/head angle, etc.) multiple times, thereby generating the second image data set.

Similar to the first image collection unit 100, the second image collection unit 200 also acquires the image data of the driver's seat where drivers having various head angles are positioned through the driver monitoring system mounted on a vehicle (vehicle of the vehicle model for which the automatic driver recognition function is to be set).

The custom data generation unit 300 analyzes the second image data set by the second image collection unit 200 and performs the labeling on the head area. The labeling process is usually performed manually, and since the second image data set corresponds to data specialized for a small number of application fields, as described above, the second image data set can be performed manually. The image data of the driver's seat included in the manually input second image data set is analyzed, and the head area for each image data is labeled as a bounding box (BBOX).

The custom data generation unit 300 generates the custom data set including the corresponding image data and labeling coordinate information based on each pieces of unique information.

That is, the second image data set by the second image collection unit 200 is matched with the unique information-image data of driver's seat, and is matched with unique information-image data of driver's seat-labeling coordinates (head area coordinates) through the custom data generation unit 300 to generate the custom data set.

It is preferable that the region of interest setting unit 400 overlaps all labeling areas constituting the custom data set by the custom data generation unit 300 and sets the entire overlapping area as the region of interest (ROI). That is, a rectangular area including the entire BBOX is set as the ROI.

It is preferable that the anchor box setting unit 500 determines, as a predetermined number of anchor box areas, the region of interest set by the region of interest setting unit 400 based on an average value of sizes and an average value of ratios of all labeling areas constituting the custom data set by the custom data generation unit 300.

That is, as described above, the driver's head area positioned in the driver's seat does not differ greatly for each driver in the size, ratio, position, and the like. Based on this point, the region of interest setting unit 400 overlaps the labeling area by all the image data constituting the custom data set and sets the overlapping labeling area as one region of interest, and the anchor box setting unit 500 sets one region of interest as multiple anchor box areas in consideration of the average size/average ratio of the labeling areas of all the image data constituting the custom data set.

Figure 2:
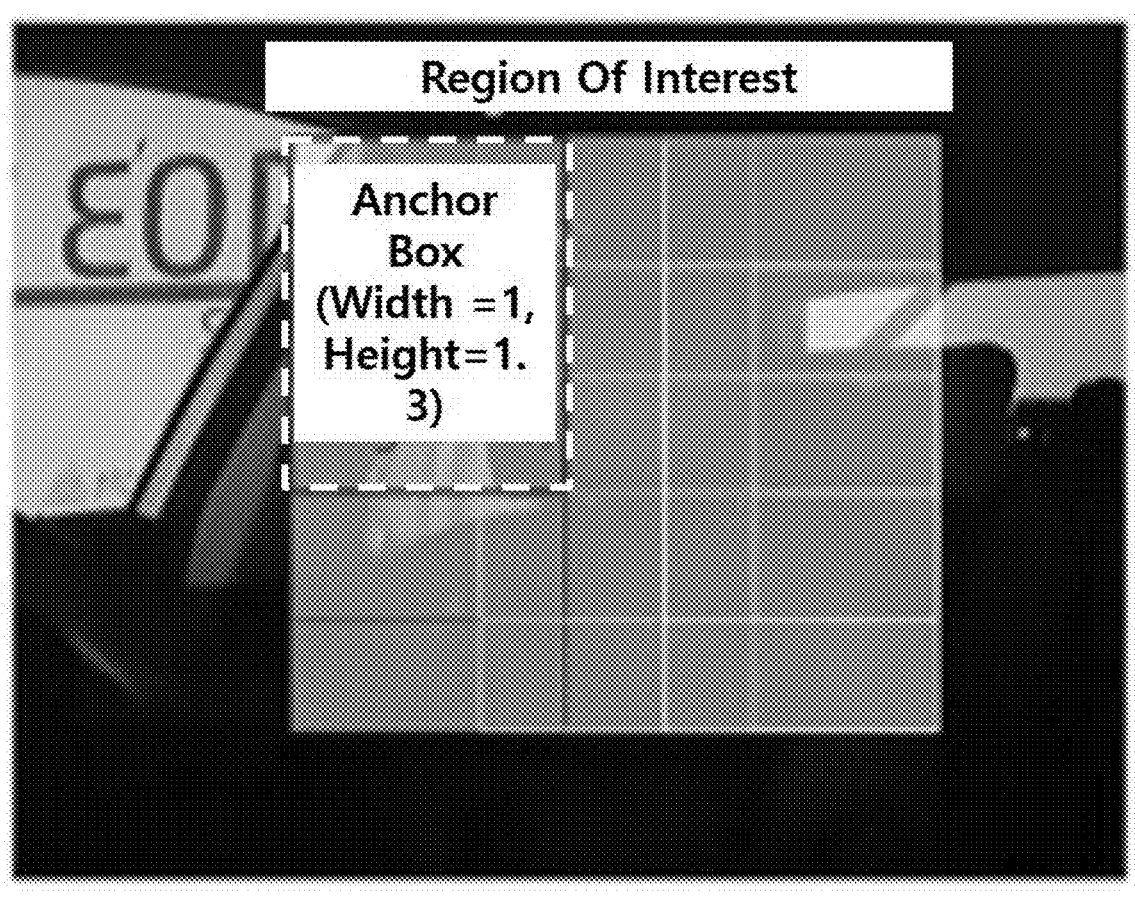
FIG. 2 is an exemplary diagram illustrating a region of interest set in a driver recognition system and method thereof according to an embodiment of the present disclosure and a plurality of anchor box regions included therein.

As a result of the experiment, the labeling area based on the image data acquired through the current driver monitoring system shows the average value of the size and ratio in the ratio of width 1:height 1.3, and FIG. 2 is a diagram illustrating that nine anchor box areas are set in one ROI as a result of various experiments according to the present disclosure. This is only one embodiment of the present disclosure, and when the resolution of the image data increases with the development of the driver monitoring system, this may also be changed.

The input data selection unit 600 is a component that selects a learning data set for generating an object detection model. The input data selection unit 600 selects at least one data set from among open data sets pre-collected on a probability basis and custom data sets generated and stored by the custom data generation unit 300.

In this case, the input data selection unit 600 applies a random function, and any one of the two data sets may be selected, and most preferably, the two data sets are selected with a similar probability and the repeated learning is performed.

The data pre-processing unit 700 extracts a predetermined number of anchor box areas set by the anchor box setting unit 500 for each data (image data) constituting the data set selected by the input data selection unit 600.

In other words, it is preferable to extract the anchor box area so that the object detection network has a low calculation amount, and to perform learning only on the corresponding area.

As illustrated in FIG. 1, the data pre-processing unit 700 performs a first pre-processing unit 710 when the custom data set is selected by the input data selection unit 600, and performs a 2-1-th pre-processing unit 720, a 2-2-th pre-processing unit 730, and a 2-3-th pre-processing unit 740, and the 2-4-th pre-processing unit 750 when the open data set is selected.

When the custom data set is selected by the input data selection unit 600, the first pre-processing unit 710 extracts a predetermined number of anchor box areas set by the anchor box setting unit 500 for each image data constituting the custom data set.

Since the anchor box area itself set by the anchor box setting unit 500 is set based on the image data constituting the custom data set, when nine anchor box areas are extracted for each image data by the first pre-processing unit 710, the head area is included in at least one anchor box area.

As the open data set, a CelebA data set, which is a representative face data set, may be used. The CelebA data set is composed of about 200,000 face images, and basically includes about 10,000 people. That is, about 20 face image data are included per person, and there are 40 binary labels for each face. For example, labels such as young, male, old, female, and bald are attached.

When these labels are collected and used, it is possible to learn generalized features through a large number of evenly distributed data of the open data set.

To this end, when the open data set is selected by the input data selection unit 600, the 2-1-th pre-processing unit 720 uses a pre-stored object detection model for each image data constituting the open data set to detect the head area data.

The object detection model used in the 2-1-th pre-processing unit 720 is preferably a normal object detection model, and since the open data set itself already includes only a face, it does not matter that the performance of the object detection model used is not excellent.

It is preferable that the 2-2-th pre-processing unit 730 randomly adjusts at least one of hue, saturation, brightness, and transparency for the head area data of the open data set detected by the 2-1-th pre-processing unit 720.

This means that the hue, saturation, brightness, and transparency of the driver's face data acquired as the image data may appear different depending on various external weather conditions while driving the vehicle while sitting in the driver's seat. However, since it is realistically impossible to obtain sufficient actual data for all of these conditions, it is randomly adjusted through the 2-2-th pre-processing unit 730.

It is preferable that the 2-3-th pre-processing unit 740 randomly receives at least one of the first image data from the first image collection unit 100. That is, the image data without a driver in the driver's seat is randomly received.

Thereafter, the 2-3-th pre-processing unit 740 positions the head area data by the 2-2-th pre-processing unit 730 in the corresponding image data (image data without the driver in the driver's seat) to generate a synthetic data set. In this case, the head area data by the 2-2-th pre-processing unit 730 is the head area data in which at least one of hue, saturation, brightness, and transparency is randomly adjusted.

In this case, it is preferable that the 2-3-th pre-processing unit 740 positions the head area data in the image data without the driver in the driver's seat and randomly positions the head area data in the region of interest coordinates set by the region of interest setting unit 400.

That is, the head area data is not synthesized anywhere in the image data without the driver in the driver's seat, but as a result of analyzing the collected data set, is randomly synthesized within the region of interest coordinates so that it is positioned in the area where the head area data is likely to be positioned.

In this way, it is data generated by extracting the synthetic data set from the open data set within the region of interest coordinates of the image data (data specialized for a small amount of application field) without the driver in the driver's seat, and synthesizing the randomly adjusted head area data (a large number of data with an even distribution).

The 2-4-th pre-processing unit 750 extracts a predetermined number of anchor box areas set by the anchor box setting unit 500 for each data constituting the synthetic data set generated by the 2-3-th pre-processing unit 740.

In this case, since the synthesized data is synthesized by randomly positioning the head area data extracted from the open data set within the region of interest within the coordinates of the region of interest, when extracting nine anchor box areas constituting the region of interest, there is a high possibility that the head area is included in at least one anchor box area.

The learning processing unit 800 performs learning processing by inputting data based on each anchor box area extracted by the data pre-processing unit 700 to the pre-stored object detection network.

It is preferable to generate, store, and transmit the object detection model as the learning processing result.

Here, each anchor box area-based data extracted by the data pre-processing unit 700 refers to the anchor box area data extracted from the custom data set through the above-described processes or the anchor box area data extracted from the synthetic data set.

The CNN algorithm is most commonly used as the pre-stored object detection network, and is composed of a plurality of convolutional layers and a pooling layer to extract the feature map of each anchor box area and detect the head object.

In the learning processing process, weights for each layer constituting the object detection network are updated and set.

That is, a loss function is used to measure how close the output of the model is to a correct answer (actual value), and the smaller the error, the smaller the value of the loss function. In this way, the network learning is repeatedly performed in a direction with a smaller loss function, and at this time, an optimization technique used for the repetitive performance is used. The optimization technique is a process of finding weights that minimize a loss function, and moves the weights little by little in the direction in which the output value of the loss function decreases from the current position.

In this case, the weights for each layer are updated by using cross entropy loss as the loss function and using a stochastic gradient decent method as the optimization technique. That is, the head area based on the anchor box area is detected from any one input image, and the loss function between the detected head area result and the actual label result (correct answer data) is obtained, but the optimization technique is used to minimize the loss function to update the weight of the layer constituting the network.

In order to generate the driver matching model, as illustrated in FIG. 1, the driver recognition system according to an embodiment of the present disclosure includes a feature pre-processing unit 900, a first learning processing unit 1000, a feature extraction unit 1100, and a second learning processing unit 1200. Each component preferably performs an operation through arithmetic processing means including a computer, and as described above, performs an operation an arithmetic processing means such as an ECU including a computer performing transmission and reception through an in-vehicle communication channel.

A general face recognition technique performs preprocessing to find face features such as eyes and nose, align the found features, and convert the aligned features into the same shape and size. However, in this case, when an error occurs in the process of finding the feature, the recognition performance is lowered, and there is a problem in that it is not possible to determine whether the pre-processing is optimal for the classification network.

Accordingly, in the present disclosure, by using deformable convolution for the network configuration and allowing the network to directly adjust the spatial position of the extracted features, there is an advantage in reducing pre-processing errors and calculation amount.

In addition, first, through the process of learning to divide/classify the face image data and unique information in the classification network, learning is performed by updating layer parameters to extract the general features from the face image data, and by applying the learned layer parameters as they are, it is applied to extract the general features for comparing whether two face image data are identical.

In this case, by changing the composition to the AAP layer rather than the GAP layer included in the base network constituting the classification network, the size of the extracted feature is reduced and then abstracted and input to the feature comparator, thereby improving the accuracy.

In detail, it is preferable that the feature pre-processing unit 900 uses the object detection model generated in advance by the learning processing unit 800 to analyze the custom data set generated by the custom data generation unit 300 and the synthetic data set generated by the 2-3-th pre-processing unit 740 and extract the face area data from each image data.

Thereafter, it is preferable that the feature pre-processing unit 900 assigns the unique information to each extracted face area data.

The first learning processing unit 1000 inputs the face area data to which the unique information is assigned by the feature pre-processing unit 900 to the pre-stored classification network to perform learning processing.

In this case, as described above, by constructing each layer of the classification network using deformable convolution, it is possible to directly adjust the spatial position of the feature, and the position is most preferably the coordination position of the region of interest set by the region of interest setting unit 400.

In addition, the classification network may include classification networks such as ResNET and VGG16, and is composed of a base network composed of a plurality of convolutional layers and a plurality of pooling layers, and an end-to-end network composed of at least two fully-connected (FC) layers, and an activation function layer (softmax function, etc.). The base network extracts features of the input learning data set.

The convolution layer is composed of one or more filters, and the number of filters indicates the depth of a channel. The more filters, the more image features are extracted. An image pixel value that has passed through these filters has distinct features such as hue, line, shape, and border, and an image that has passed through the filter has feature values, so it is called a feature map, and this process is called a convolution operation. As the convolution operation proceeds, the image size decreases and the number of channels increases.

The pooling layer is composed immediately after the convolution layer and serves to reduce the spatial size. In this case, the special size reduces the size of the width and height, and the size of the channel is fixed. In this way, since the size of the input data is reduced and the learning is not performed, the number of variables is reduced to prevent overfitting from occurring.

The end-to-end network determines the class (unique information) classification for the features extracted from the base network. By using a preset activation function layer, a final network output value is determined and output as a class having the highest probability among the classified classes.

In this case, the softmax function is set as a preset activation function layer, and the softmax function is configured to classify the classes in the final layer, and normalizes the input values to values between 0 and 1 to form and output a probability distribution with a sum of 1.

In addition, the first learning processing unit 1000 updates and sets the weight for the configured layer based on the network output value using a preset loss function and optimization technique.

That is, a loss function is used to measure how close the output of the model is to a correct answer (actual value), and the smaller the error, the smaller the value of the loss function. In this way, the network learning is repeatedly performed in a direction with a smaller loss function, and at this time, an optimization technique used for the repetitive performance is used. The optimization technique is a process of finding weights that minimize the loss function, and moves the weights little by little in the direction in which the output value of the loss function decreases from the current position.

In this case, it is preferable that the first learning processing unit 1000 uses the cross entropy loss as the loss function and uses the stochastic gradient decent method as the optimization technique.

The operation by the first learning processing unit 1000 is operated similar to supervised learning of the conventional classification network.

The feature extraction unit 1100 uses at least two feature extraction networks including a base network in which the learning result of the first learning processing unit 1000 is reflected.

The face area data to which the unique information is assigned by the feature pre-processing unit 900 is input to one selected feature extraction network, and the face area data corresponding to the custom data set among the face area data to which the unique feature is assigned by the feature pre-processing unit 900 is input to another feature extraction network.

Each feature extraction network is in a state in which the learning processing has already been completed by the first learning processing unit 1000, and extracts general face features of the input face area data.

The second learning processing unit 1200 includes a feature comparator layer connected to the rear end of the two feature extraction networks by the feature extraction unit 1100. The second learning processing unit 1200 compares the data features of each face area extracted by the feature extraction unit 1100 and performs the learning processing to determine whether two face area data are identical. The driver matching model is preferably the learning model generated as the learning processing result of the second learning processing unit 1200.

In this case, in the actual inference step, the size of the input image (extracted face area data) and the registered image (pre-registered face area data) may be different.

Since it is a network that compares the features extracted from two images, respectively, and determines whether the two images are the same, the final layer constituting each base network of the two feature extraction networks by the feature extraction unit 1100 is configured by changing the global average pooling (GAP) layer, which is the final layer constituting the base network of the normal classification network, to the adaptive average pooling (AAP) layer.

In this way, even if the sizes of each image input to the two feature extraction networks, respectively, are different, the feature is output with the same fixed size, and the two data features are compared to determine whether the face area data is the same.

The second learning processing unit 1200 also updates and sets the weight for the configured layer based on the network output value using a preset loss function and optimization technique.

That is, the loss function is used to measure how close the output of the model is to a correct answer (actual value), and the smaller the error, the smaller the value of the loss function. In this way, the network learning is repeatedly performed in a direction with a smaller loss function, and at this time, an optimization technique used for the repetitive performance is used. The optimization technique is a process of finding weights that minimize a loss function, and moves the weights little by little in the direction in which the output value of the loss function decreases from the current position. In this case, it is preferable to use the cross entropy loss as the loss function and use the stochastic gradient decent method as the optimization technique.

In addition, in the driver recognition system according to an embodiment of the present disclosure, in order to extract the general features that are easy to compare the features of two face area data in the feature extraction unit 1100, the learning processing process by the first learning processing unit 1000 is set to have a 5% learning rate, and instead, the learning processing process including the feature comparator layer by the second learning processing unit 1200 is set to perform learning at 5 times more frequent than the learning processing process by the first learning processing unit 1000.

That is, the classification network and the feature extraction network repeat the learning process at a predetermined frequency to perform the learning processing, so the features advantageous to driver matching may be extracted and compared without losing generality.

Summarizing the driver recognition system according to an embodiment of the present disclosure, in the vehicle development stage, by using the open data set and the custom data set, the learning processing of the object detection network (object detection model) and the feature extraction network (driver matching model) optimized for the desired vehicle model situation without losing the generalized features based on the set region of interest is performed. Thereafter, in the vehicle mass production stage, the user uses the system.

When each driver selects the driver registration request, the driver monitoring system inputs a number of image data with the head angle changed. In this case, the desired seat position, side mirror position, sound setting value, and USM setting value are also stored/registered.

In this way, when the vehicle is used after the registration setting is completed, the face area is extracted from the object detection model of the image data of the driver acquired through the driver monitoring system after starting, and it is determined whether there is the same image data as the image data registered in the driver matching model. When it is determined that there is the same person (when there is the same image data among the registered image data), the registered setting values are automatically applied.

Figure 3:
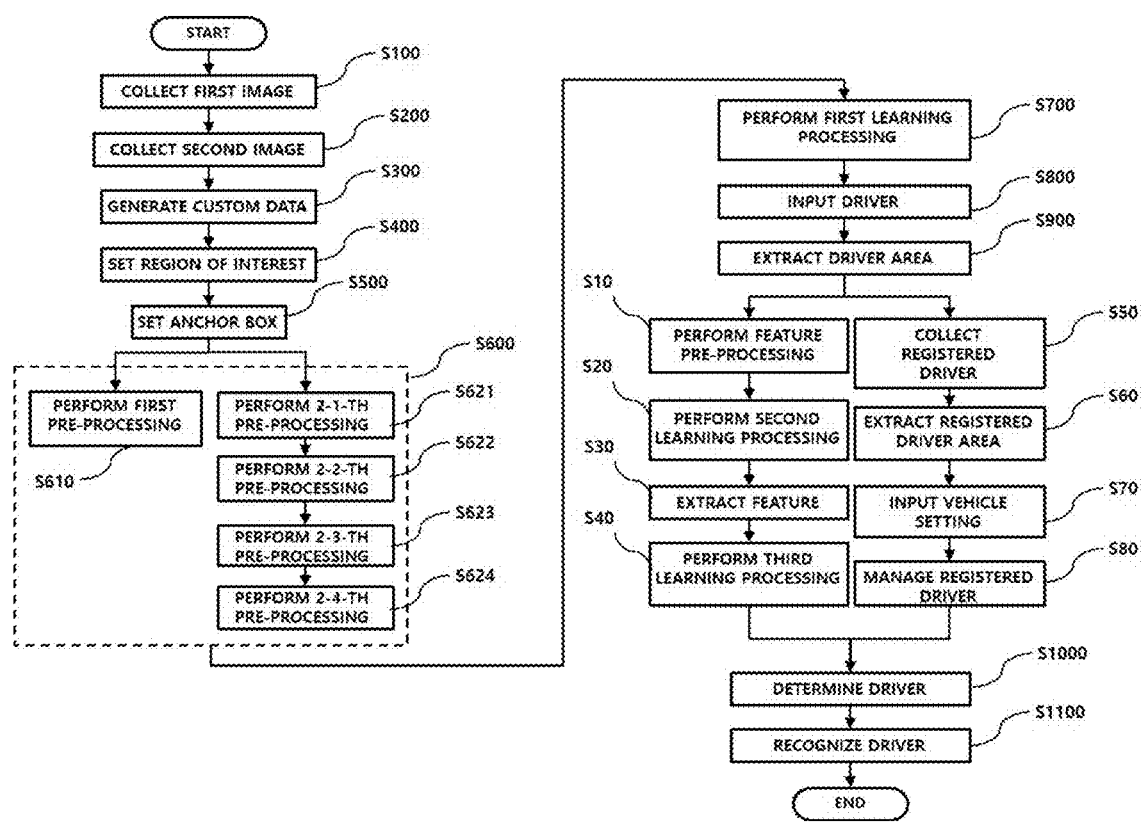
FIG. 3 is an exemplary flowchart illustrating a driver recognition method according to an embodiment of the present disclosure.

FIG. 3 illustrates a flowchart of a driver recognition method according to an embodiment of the present disclosure.

As illustrated in FIG. 3, the driver recognition method according to an embodiment of the present disclosure includes a first image collection step (S100), a second image collection step (S200), a custom data generation step (S300), a region of interest setting step (S400), an anchor box setting step (S500), a data preprocessing step (S600), a first learning processing step (S700), a driver input step (S800), a driver area extraction step (S900), a driver determination step (S1000), and a driver recognition step (S1100). Each step preferably uses a driver recognition system that is operated by arithmetic processing means.

The first image collection step (S100), the second image collection step (S200), the custom data generation step (S300), the region of interest setting step (S400), the anchor box setting step (S500), the data preprocessing step (S600), and the first learning processing step (S700) are performed in the vehicle development stage, and the driver input step (S800), the driver area extraction step (S900), the driver determination step (S1000), and the driver recognition step (S1100) are performed while the user uses the system in the vehicle mass production stage.

Each step will be described in detail.

In the first image collection step (S100), the first image collection unit 100 acquires a first image data set, which is image data of a driver's seat, in a driverless situation for each illumination controlled according to a predetermined condition, for each vehicle model for which the automatic driver recognition function is to be set in advance.

In short, the image data of the driver's seat without the driver of the vehicle model to set the automatic driver recognition function is acquired. In this case, the image data of the driver's seat is acquired while controlling illumination in consideration of various external weather conditions applicable to driving.

In the first image collection step (S100), image data of a driver's seat without a driver is acquired through a driver monitoring system mounted on a vehicle (vehicle of the vehicle model for which the automatic driver recognition function is to be set).

In the second image collection step (S200), the second image collection unit 200 seats the driver to which the unique information is assigned in the driver's seat, for each vehicle model for which the automatic driver recognition function is to be set (mounted) in advance and then requests to change the head angle by a predetermined number of times, and acquires the second image data set which is the image data of the driver's seat.

That is, drivers are recruited to generate the custom data set, assigns the unique information to the recruited drivers, each driver gets on the corresponding vehicle (vehicles for each vehicle model for which the automatic driver recognition function is to be set), and then acquires the image data of the driver's seat for each request while requesting the head angle change (head position/head angle, etc.) multiple times, thereby generating the second image data set.

Similar to the first image collection step (S100), in the second image collection step (S200), the image data of the driver's seat where drivers having various head angles are positioned is acquired through the driver monitoring system mounted on a vehicle (vehicle of the vehicle model for which the automatic driver recognition function is to be set).

In the custom data generation step (S300), the custom data generation unit 300 analyzes the second image data set by the second image collection step (S200) to perform labeling on the head area and generate a custom data set including corresponding image data and labeling coordinate information based on each piece of unique information.

In detail, in the custom data generation step (S300), the second image data set is analyzed and the labeling of the head area is performed. The labeling process is usually performed manually, and since the second image data set corresponds to data specialized for a small number of application fields, the second image data set can be performed manually. The image data of the driver's seat included in the manually input second image data set is analyzed, and the head area for each image data is labeled as a bounding box (BBOX).

Then, in the custom data generation step (S300), the custom data set including the corresponding image data and the labeling coordinate information is generated based on each piece of unique information.

That is, the second image data set matches the unique information-image data of driver's seat, and matches unique information-image data of driver's seat-labeling coordinates (head area coordinates) to generate the custom data set.

In the region of interest setting step (S400), the region of interest setting unit 400 overlaps all the labeling areas constituting the custom data set by the custom data generation step (S300) and sets the entire overlapping area as the region of interest (ROI). That is, a rectangular area including the entire BBOX is set as the ROI.

In the anchor box setting step (S500), the anchor box setting unit 500 sets the region of interest to a predetermined number of anchor box areas based on an average size value and an average ratio value of all the labeling areas constituting the custom data set by the custom data generation step (S300).

That is, the driver's head area positioned in the driver's seat does not differ greatly for each driver in the size, ratio, position, and the like. Based on this point, in the region of interest setting step (S400), the labeling areas overlaps by all the image data constituting the custom data set and the overlapping labeling area is set as one region of interest, and in the anchor box setting step (S500), one region of interest is set as multiple anchor box areas in consideration of the average size/average ratio of the labeling areas of all the image data constituting the custom data set.

As a result of the experiment, the labeling area based on the image data acquired through the current driver monitoring system shows the average value of the size and ratio in the ratio of width 1:height 1.3, and FIG. 2 is a diagram illustrating that nine anchor box areas are set in one ROI as a result of various experiments according to the present disclosure. This is only one embodiment of the present disclosure, and when the resolution of the image data increases with the development of the driver monitoring system, this may also be changed.

In the data pre-processing step (S600), the input data selection unit 600 selects any one of the open data set pre-collected based on the probability and the custom data set stored by the custom data generation step (S300), and extracts a predetermined number of anchor box areas set by the anchor box setting step (S500) for each data constituting the selected data set. In other words, by extract the anchor box area so that the object detection network has a low calculation amount, the learning is performed only on the corresponding area.

In this case, in the data pre-processing step (S600), the random function is applied, and any one of the two data sets may be selected, and most preferably, the two data sets are selected with a similar probability and the repeated learning is performed.

As illustrated in FIG. 3, in the data pre-processing step (S600), when the custom data set is selected, a first pre-processing step (S610) is performed, and when the open data set is selected, a 2-1-th pre-processing step (S621), a 2-2-th pre-processing step (S622), a 2-3-th pre-processing step (S623), and a 2-4-th pre-processing step (S624) are performed.

In the first pre-processing step (S610), when the custom data set is selected, a predetermined number of anchor box areas set by the anchor box setting step (S500) is extracted for each data constituting the custom data set.

Since the anchor box area itself set by the anchor box setting step 500 is set based on the image data constituting the custom data set, when nine anchor box areas are extracted for each image data by the first pre-processing step (S610), the head area is included in at least one anchor box area.

As the open data set, a CelebA data set, which is a representative face data set, may be used. The CelebA data set is composed of about 200,000 face images, and basically includes about 10,000 people. That is, about 20 face image data are included per person, and there are 40 binary labels for each face. For example, labels such as young, male, old, female, and bald are attached.

When these labels are collected and used, it is possible to learn generalized features through a large number of evenly distributed data of the open data set.

To this end, in the 2-1-th preprocessing step (S621), when the open data set is selected, the head area data is detected for each image data constituting the open data set by using the pre-stored object detection model.

The object detection model used in the 2-1-th pre-processing step (S621) is preferably a normal object detection model, and since the open data set itself already includes only a face, it does not matter that the performance of the object detection model used is not excellent.

In the 2-2-th pre-processing step (S622), at least one of the hue, saturation, brightness, and transparency of the head area data detected by the 2-1-th pre-processing step (S621) is randomly adjusted.

This means that the hue, saturation, brightness, and transparency of the driver's face data acquired as the image data may appear different depending on various external weather conditions while driving the vehicle while sitting in the driver's seat. However, since it is realistically impossible to obtain sufficient actual data for all of these conditions, it is randomly adjusted through the 2-2-th pre-processing step (S622).

In the 2-3-th pre-processing step (S623), at least one image data of the first image data set by the first image collection step (S100) is randomly received, and the head area data by the 2-2-th pre-processing step (S622) is positioned in the corresponding image data to generate the synthetic data set. In this case, the head area data is randomly positioned within the region of interest coordinates set by the region of interest setting step (S400).

In detail, in the 2-3-th pre-processing step (S623), it is preferable to randomly receive at least one image data of the first image data. That is, the image data without a driver in the driver's seat is randomly received.

Thereafter, the synthetic data set is generated by positioning the head area data in the corresponding image data (image data without a driver in the driver's seat). In this case, the head area data is head area data in which at least one of hue, saturation, brightness, and transparency is randomly adjusted.

In the 2-3-th preprocessing step (S623), the head area data is randomly positioned within the set coordinates of the region of interest, in positioning the head area data in the image data without the driver in the driver's seat.

That is, the head area data is not synthesized anywhere in the image data without the driver in the driver's seat, but as a result of analyzing the collected data set, is randomly synthesized within the region of interest coordinates so that it is positioned in the area where the head area data is likely to be positioned.

In this way, it is data generated by extracting the synthetic data set from the open data set within the region of interest coordinates of the image data (data specialized for a small amount of application field) without the driver in the driver's seat, and synthesizing the randomly adjusted head area data (a large number of data with an even distribution).

In the 2-4-th pre-processing step (S624), the predetermined number of anchor box areas set by the anchor box setting step (S500) is extracted for each data constituting the synthetic data set.

In this case, since the synthesized data is synthesized by randomly positioning the head area data extracted from the open data set within the region of interest within the coordinates of the region of interest, when extracting nine anchor box areas constituting the region of interest, there is a high possibility that the head area is included in at least one anchor box area.

In the first learning processing step (S700), the learning processing unit 800 inputs each anchor box area-based data extracted by the data pre-processing step (S600) to a pre-stored object detection network and performs the learning processing to generate the object detection model.

Here, each anchor box area-based data extracted by the data pre-processing step (S600) refers to the anchor box area data extracted from the custom data set through the above-described processes or the anchor box area data extracted from the synthetic data set.

The CNN algorithm is most commonly used as the pre-stored object detection network, and is composed of a plurality of convolutional layers and a pooling layer to extract the feature map of each anchor box area and detect the head object.

In the learning processing process, weights for each layer constituting the object detection network are updated and set.

That is, a loss function is used to measure how close the output of the model is to a correct answer (actual value), and the smaller the error, the smaller the value of the loss function. In this way, the network learning is repeatedly performed in a direction with a smaller loss function, and at this time, an optimization technique used for the repetitive performance is used. The optimization technique is a process of finding weights that minimize the loss function, and moves the weights little by little in the direction in which the output value of the loss function decreases from the current position.

In this case, the weights for each layer are updated by using cross entropy loss as the loss function and using a stochastic gradient decent method as the optimization technique. That is, the head area based on the anchor box area is detected from any one input image, and the loss function between the detected head area result and the actual label result (correct answer data) is obtained, but the optimization technique is used to minimize the loss function to update the weight of the layer constituting the network.

In the driver input step (S800), the driver input unit 1 receives image data of a driver seated in a driver's seat in a vehicle in which an automatic driver recognition function is set.

In the driver input step (S800), the driver input unit 1 receives image data of a driver seated in a driver's seat through a driver monitoring system mounted on the vehicle. In this case, the driver monitoring system is a sensor mounted on a room mirror, etc., and is usually used to monitor driver's attention, which is one of the safety assist driving functions, but since automatically recognizing a driver and automatically setting a vehicle environment optimized for each driver (side mirror position, vehicle seat position, sound setting value, user setting menu (USM) value, etc.) is also one of the important safety assist driving functions in a broad sense, it is possible to receive the automatically recognized driver and automatically set vehicle environment.

In the driver area extraction step (S900), the driver area extraction unit 2 uses the object detection model generated by the first learning processing step (S700) to analyze the image data of the driver by the driver input step (S800) and extract the driver's head area data.

In the driver determination step (S1000), the driver determination unit 3 analyzes the extracted head region data and the pre-registered driver's head area data by the driver area extraction step (S900) using a stored machine learning-based driver matching model, and determines whether there is matched data.

In this case, the learning processing process of the stored driver matching model will be described later in detail.

In the driver recognition step (S1100), the driver recognition unit 4 extracts the unique information matched to the corresponding head region data when it is determined that there is the matched data according to the determination result of the driver determination step (S1000), and performs the automatic driver recognition function using the extracted unique information.

In other words, in the driver recognition step (S1100), the unique information matching the corresponding head area data is extracted when there is a registered driver matching the head area data extracted from the driver area extraction step (S900) according to the determination result of the driver determination step (S1000), and the automatic driver recognition function is performed using the extracted unique information.

Here, the automatic driver recognition function refers to automatically controlling the state of the vehicle according to vehicle setting information (side mirror position, vehicle seat position, sound setting value, user setting menu (USM) value, etc.) previously received from the driver.

Accordingly, in the driver recognition step (S1100), the extracted unique information is used to control the state of the vehicle according to the vehicle setting information previously received from the driver matching the unique information.

In addition, a user welcome message and sound may be output from the in-vehicle head unit.

As illustrated in FIG. 3, in order to store the machine learning-based driver matching model, prior to performing the driver determination step (S1000), the driver recognition method according to an embodiment of the present disclosure further includes a feature preprocessing step (S10), a second learning process step (S20), a feature extraction step (S30), and a third learning process step (S40).

In the feature pre-processing step (S10), the feature pre-processing unit 900 uses the object detection model generated by the first learning processing step (S700) in advance to analyze the custom data set generated by the custom data generation step (S300) and the synthetic data set generated by the 2-3 preprocessing step (S623), extract the face area data from each image data, and assign the unique information to each extracted face area data.

In the second learning processing step (S20), the first learning processing unit 1000 inputs the face area data to which the unique information is assigned by the feature preprocessing step (S10) to the pre-stored classification network to perform the learning processing.

In this case, by constructing each layer of the classification network using deformable convolution, it is possible to directly adjust the spatial position of the feature, and the position is most preferably the coordination position of the region of interest set by the region of interest setting step (S400).

In addition, the classification network may include classification networks such as ResNET and VGG16, and is composed of a base network composed of a plurality of convolutional layers and a plurality of pooling layers, and an end-to-end network composed of at least two fully-connected (FC) layers, and an activation function layer (softmax function, etc.). The base network extracts features of the input learning data set.

The convolution layer is composed of one or more filters, and the number of filters indicates the depth of a channel. The more filters, the more image features are extracted. An image pixel value that has passed through these filters has distinct features such as hue, line, shape, and border, and an image that has passed through the filter has feature values, so it is called a feature map, and this process is called a convolution operation. As the convolution operation proceeds, the image size decreases and the number of channels increases.

The pooling layer is composed immediately after the convolution layer and serves to reduce the spatial size. In this case, the special size reduces the size of the width and height, and the size of the channel is fixed. In this way, since the size of the input data is reduced and the learning is not performed, the number of variables is reduced to prevent overfitting from occurring.

The end-to-end network determines the class (unique information) classification for the features extracted from the base network. By using a preset activation function layer, a final network output value is determined and output as a class having the highest probability among the classified classes.

In this case, the softmax function is set as a preset activation function layer, and the softmax function is configured to classify the classes in the final layer, and normalizes the input values to values between 0 and 1 to form and output a probability distribution with a sum of 1.

In the second learning processing step (S20), the weight for the configured layer is updated and set based on the network output value using the preset loss function and optimization technique.

That is, a loss function is used to measure how close the output of the model is to a correct answer (actual value), and the smaller the error, the smaller the value of the loss function. In this way, the network learning is repeatedly performed in a direction with a smaller loss function, and at this time, an optimization technique used for the repetitive performance is used. The optimization technique is a process of finding weights that minimize the loss function, and moves the weights little by little in the direction in which the output value of the loss function decreases from the current position. In this case, it is preferable to use the cross entropy loss as the loss function and use the stochastic gradient decent method as the optimization technique.

In the feature extraction step (S30), the feature extraction unit 1100 uses at least two feature extraction networks including the base network in which the learning result of the first learning processing step (S20) is reflected to input the face area data to which the unique information is assigned by the feature pre-processing step (S10) to any one selected feature extraction network and input the face area data corresponding to the custom data set among the face area data to which the unique information is assigned by the feature pre-processing step (S10) to another feature extraction network, thereby extracting features from each network.

In detail, the feature extraction step (S30) uses at least two feature extraction networks including the base network in which the learning result of the second learning processing step (S20) is reflected.

The face area data to which the unique information is assigned by the feature pre-processing step (S10) is input to one selected feature extraction network, and the face area data corresponding to the custom data set among the face area data to which the unique feature is assigned by the feature pre-processing unit (S10) is input to another feature extraction network.

Each feature extraction network is in a state in which the learning processing has already been completed by the second learning processing step (S20), and extracts general face features of the input face area data.

In the third learning processing step (S40), the second learning processing unit 1200 compares the features of each face area data extracted by the feature extraction step (S30) by including a feature comparator layer connected to rear ends of the two feature extraction networks to perform the learning processing of determining whether the features are identical.

The driver matching model is a learning model generated as the learning processing result of the third learning processing step (S40).

In this case, in the actual inference step, the size of the input image (extracted face area data) and the registered image (pre-registered face area data) may be different.

Since it is a network that compares the features extracted from two images, respectively, and determines whether the two images are the same, the final layer constituting each base network of the two feature extraction networks is configured by changing the global average pooling (GAP) layer, which is the final layer constituting the base network of the normal classification network, to the adaptive average pooling (AAP) layer.

In this way, even if the sizes of each image input to the two feature extraction networks, respectively, are different, the feature is output with the same fixed size, and the two data features are compared to determine whether the face area data is the same.

In the third learning processing step (S40), the weight for the configured layer is updated and set based on the network output value using the preset loss function and optimization technique.

That is, a loss function is used to measure how close the output of the model is to a correct answer (actual value), and the smaller the error, the smaller the value of the loss function. In this way, the network learning is repeatedly performed in a direction with a smaller loss function, and at this time, an optimization technique used for the repetitive performance is used. The optimization technique is a process of finding weights that minimize the loss function, and moves the weights little by little in the direction in which the output value of the loss function decreases from the current position. In this case, it is preferable to use the cross entropy loss as the loss function and use the stochastic gradient decent method as the optimization technique.

In addition, as illustrated in FIG. 3, in the driver recognition method according to an embodiment of the present disclosure, in order to register the driver's head area data in advance, prior to performing the driver determination step (S1000), a registered driver collection step (S50), a registered driver area extraction step (S60), a vehicle setting input step (S70), and a registered driver management step (S80) are further included.

In the registered driver collection step (S50), the registered driver collection unit 10 transmits a driver registration request-related message or the like to a display means in a vehicle or a terminal means possessed by the driver when the driver is seated in a vehicle for which the automatic driver recognition function has been set in advance.

Thereafter, when the received message is transmitted or when a predetermined time has elapsed after the driver is seated, the image data of the driver is acquired.

The image data of the driver is acquired through the driver monitoring system mounted on the vehicle. The driver monitoring system is preferably a sensor mounted on a room mirror or the like.

In this case, it is preferable to request a driver to change his/her head angle for each operation while repeatedly performing an operation for a predetermined number of times, rather than simply acquiring frontal image data of a driver's face. In this way, the image data of the driver having various head angles is acquired.

In the registered driver area extraction step (S60), the registered driver area extraction unit 20 uses the object detection model generated by the first learning processing step (S700) to analyze the image data of the driver by the registered driver collection step (S50) and extract the driver's head area data.

In the vehicle setting input step (S70), the vehicle setting input unit 30 receives desired vehicle setting information (side mirror position, vehicle seat position, sound setting values, various other USM values, etc.) to a corresponding driver, that is, a driver seated in a driver's seat for driver registration. Since the vehicle setting information is information that can be added/changed as various controllers in the vehicle is developed, the vehicle setting information is not limited thereto.

In the registered driver management step (S80), the registered driver management unit 40 generates unique information for each driver, matches the unique information generated for each driver, the head area data extracted by the registered driver area extraction step (S60), and the setting information received by the vehicle setting input step (S70) to store and manage the matched information.

In this way, in the driver determination step (S1000), the head area data stored and managed by the registered driver management step (S80) is received as the head area data of the registered driver, and determines whether the received head area data matches the head area data extracted through the driver area extraction unit 2.

That is, by managing face data/setting information based on the unique information from a driver who wants to use a vehicle in which the automatic driver recognition function is set, it is used as pre-registered driver information in the driver matching step later.

Based on this, as an example of the driver recognition method according to an embodiment of the present disclosure in a car sharing environment, when five drivers are registered in one vehicle, each driver may have different physical conditions or desired driving sensibility, so the control of the vehicle environment (side mirror position, vehicle seat position, sound setting value, user setting menu (USM) value, etc.) may vary for each driver.

However, when the automatic driver recognition function is not set, the driver should manually set the vehicle environment to the desired control value every time the driver uses the vehicle, which may inevitably increase inconvenience when using the car sharing regularly or periodically.

On the other hand, when the automatic driver recognition function is set through the driver recognition method according to an embodiment of the present disclosure, if the driver starts an engine after seated in the driver's seat, the driver recognition system may automatically extract the driver's face and determine whether the extracted face matches the pre-registered face to automatically control the vehicle environment based on the matched face data, thereby maximizing the use convenience of the vehicle.

To this end, as described above, learning to extract generalized features without overfitting the data in consideration of the fact that not only the accuracy of the object detection model and the driver matching model is improved, but also the amount of data that can be acquired within a limited place such as a vehicle is also limited is the most important technique.

As described above, according to a driver recognition system and method thereof according to the present disclosure, by automatically recognizing a driver's face, it is possible to automatically change and control vehicle set values (seat position, positions of side mirrors, sound set value, USM set value, etc.) set in advance for each driver (user), thereby maximizing the convenience of using the vehicle.

In particular, in order to improve driver recognition performance, it is possible to extract generalized features using a large number of well-balanced open data sets, and reduce the cost of generating learning data by performing an optimization process for each vehicle model using a small number of custom data sets.

In addition, it is possible to reduce a calculation time by eliminating pre-processing of an object detection network using deformable convolution.

In addition, in the process of comparing features of two images, by abstracting and determining extracted features using a feature extractor without simply comparing the features with a distance, it is possible to improve recognition performance.

Although preferred embodiments of the present disclosure have been described above, the embodiments disclosed in the present disclosure are only for explaining, not limiting, the technical spirit of the present disclosure. Accordingly, the technical spirit of the present disclosure includes not only each disclosed embodiment, but also a combination of the disclosed embodiments, and further, the scope of the technical spirit of the present disclosure is not limited by these embodiments. In addition, many modifications and alterations of the present disclosure may be made by those skilled in the art to which the present disclosure pertains without departing from the spirit and scope of the accompanying claims. In addition, it is to be considered that all of these modifications and alterations fall within the scope of the present disclosure as equivalents.

What is claimed is:

1. A driver recognition system, comprising:
a driver input unit configured to receive image data of a driver seated in a driver's seat in a vehicle in which an automatic driver recognition function of the driver recognition system is set;
a driver area extraction unit configured to extract driver's head area data by analyzing the image data of the driver using a stored machine learning-based object detection model;
a driver determination unit configured to analyze the extracted driver's head area data and registered driver's head area data using a stored machine learning-based driver matching model, and to determine whether there is matched data between the extracted driver's head area data and the registered driver's head area data;
a driver recognition unit configured to extract unique information matched to corresponding driver's head area data when it is determined that there is matched data according to a determination result of the driver determination unit, and to perform an automatic driver recognition function using the extracted unique information; and
a first image collection unit configured to acquire a first image data set, which is first image data of a driver's seat, in a driverless situation, for each of a plurality of illumination conditions around the driver's seat controlled according to a predetermined condition, for each vehicle model for which the automatic driver recognition function is to be set in advance,
wherein first image data set is used in generating the machine learning-based object detection model.

2. The driver recognition system of claim 1, wherein the driver recognition unit is configured to perform an automatic driver recognition function for controlling a state of the vehicle according to vehicle setting information previously received from the driver matching the unique information using the extracted unique information.

3. The driver recognition system of claim 2, further comprising:
a registered driver collection unit configured to acquire registered driver image data of a registered driver when the registered driver, who is a driver who wants to use the vehicle in which an automatic driver recognition function is set, sits in the driver's seat of the vehicle;
a registered driver area extraction unit configured to extract driver's head area data of the registered driver by analyzing the registered driver image data of the registered driver using a stored machine learning-based object detection model;

a vehicle setting input unit configured to receive desired vehicle setting information from the registered driver; and a registered driver management unit configured to generate unique information for each of a plurality of registered drivers, and to match the unique information generated for each driver who sits in the driver's seat of the vehicle, the head area data extracted by the registered driver area extraction unit, and the setting information received by the vehicle setting input unit to store and manage the matched information, wherein the driver determination unit receives head area data stored and managed by the registered driver management unit as head area data of the registered driver.

4. The driver recognition system of claim 3, wherein the registered driver collection unit is configured to repeatedly performs a registered driver collection operation for a predetermined number of times, to request the driver to change a head angle for each repetition of the registered driver collection operation, and to acquire the registered driver image data of the registered driver.

5. The driver recognition system of claim 3, further comprising:

a second image collection unit configured to acquire a second image data set of second image data when a driver to which unique information is assigned sits in the driver's seat, for each vehicle match request to the driver to change a head angle a predetermined number of times;

a custom data generation unit configured to analyze the second image data set collected by the second image collection unit to perform labeling on the head area, and to generate a custom data set including corresponding custom image data and labeling coordinate information based on each piece of unique information;

a region of interest setting unit configured to overlap all labeling areas comprising the custom data set and to setting an entire overlapping area as a region of interest (ROI); and an anchor box setting unit configured to set the region of interest to a predetermined number of anchor box areas based on an average size value and an average ratio value of all the labeling areas comprising the custom data set.

6. The driver recognition system of claim 5, further comprising:

an input data selection unit configured to select at least one data set from among an open data set pre-collected based on a probability and a stored custom data set;

a data pre-processing unit configured to extract a predetermined number of anchor box areas set by the anchor box setting unit for each data comprising the data set selected by the input data selection unit; and a learning processing unit configured to input each anchor box area-based data extracted by the data pre-processing unit to a pre-stored object detection network and to perform learning processing to generate, store, and transmit an object detection model, wherein the data pre-processing unit includes a first pre-processing unit configured to extract the predetermined number of anchor box areas set by the anchor box setting unit for each data comprising the custom data set when a custom data set is selected by the input data selection unit.

7. The driver recognition system of claim 6, wherein the data pre-processing unit further includes:

when the open data set is selected by the input data selection unit, performing:

a 2-1-th pre-processing unit configured to detect head area data for each data comprising the open data set by using the pre-stored object detection model;

a 2-2-th pre-processing unit configured to randomly adjust at least one of hue, saturation, brightness, and transparency of the head area data detected by the 2-1-th pre-processing unit;

a 2-3-th pre-processing unit configured to randomly receive at least one image data of the first image data by the first image collection unit, and to position the head area data by the 2-2-th pre-processing unit in the corresponding image data to generate a synthetic data set, and to randomly position the head area data in region of interest coordinates set by the region of interest setting unit; and a 2-4-th pre-processing unit configured to extract the predetermined number of anchor box areas set by the anchor box setting unit for each data comprising the synthetic data set.

8. The driver recognition system of claim 7, further comprising:

a feature pre-processing unit configured to analyze, in advance, a custom data set generated by the custom data generation unit and a synthetic data set generated by the 2-3-th pre-processing unit by using the object detection model generated by the learning processing unit to extract face area data from each image data, and to assign the unique information to each extracted face area data;

a first learning processing unit configured to input the face area data to which the unique information is assigned by the feature pre-processing unit to a pre-stored classification network to perform learning processing;

a feature extraction unit configured to use at least two feature extraction networks including a base network in which a learning result of the first learning processing unit is reflected to input the face area data to which the unique information is assigned by the feature pre-processing unit to any one selected feature extraction network and input the face area data corresponding to the custom data set among the face area data to which the unique information is assigned by the feature pre-processing unit to another feature extraction network, and to extract features of the face area data input from each network; and a second learning processing unit configured to include a feature comparator layer connected to rear ends of the two feature extraction networks to compare the features of each face area data extracted by the feature extraction unit and to perform the learning processing of determining whether the features are identical, wherein a final layer comprising the base network of the classification network of the first learning processing unit includes a global average pooling (GAP) layer, the final layer comprising each base network of the two feature extraction networks of the second learning processing unit includes an adaptive average pooling (AAP) layer, and the driver matching model is generated as a learning processing result of the second learning processing unit.

9. The driver recognition system of claim 1, wherein generating and using at least one of the learning-based object detection model and the learning-based driver match-ing model is based on an open-data set, pre-collected by the driver recognition system based on a probability, including a plurality of sample face images and labels for each of the sample face images, and on a custom data set for the vehicle acquired and stored by the driver recognition system.

10. The driver recognition system of claim 1, further comprising:

an input data selection unit configured to select at least one data set from among an open data set and stored custom data set; and a first learning processing unit configured to perform learning processing to generate, store, and transmit the object detection model, based on the at least one data set, to the driver area extraction unit and to a second learning processing unit, wherein the second learning processing unit is configured to use the object detection model generated by the first learning processing unit to generate the learning-based driver matching model to provide to the driver deter-mination unit to determine whether there is matched data between the extracted driver's head area data and the registered driver's head area data.

11. A driver recognition method using a driver recognition system in which each step is performed by an arithmetic processing means, the driver recognition method compris-ing:

a first image collection step of acquiring a first image data set, which is first image data of a driver's seat, in a driverless situation for each of a plurality of illumina-tion conditions controlled according to a predetermined condition, for each vehicle model for which an auto-matic driver recognition function is to be set for the driver recognition system;

a second image collection step of seating a driver, to whom unique information is assigned, in the driver's seat, for each vehicle model for which the automatic driver recognition function is to be set and acquiring a second image data set which is second image data of the driver showing a plurality of different head angles of the driver in a head area of the driver sitting in the driver's seat;

a custom data generation step of analyzing the second image data set obtained by the second image collection step to perform labeling on the head area, and gener-ating a custom data set including corresponding custom image data and labeling coordinate information based on each piece of unique information;

a region of interest setting step of overlapping all labeling areas comprising the custom data set by the custom data generation step and setting an entire overlapping area as a region of interest (ROI);

an anchor box setting step of setting the region of interest to a predetermined number of anchor box areas based on an average size value and an average ratio value of all the labeling areas comprising the custom data set by the custom data generation step;

a data pre-processing step of selecting at least one data set from among an open data set pre-collected based on a probability and a stored custom data set, and extracting a predetermined number of anchor box areas set by the anchor box setting step for each data comprising the selected data set;

a first learning processing step of inputting each anchor box area-based data extracted by the data pre-processing step to a pre-stored object detection network and performing learning processing to generate an object detection model;

a driver input step of receiving image data of the driver seated in a driver's seat in a vehicle in which an automatic driver recognition function is set;

a driver area extraction step of extracting the driver's head area data by analyzing the image data of the driver by the driver input step using the object detection model generated by the first learning processing step;

a driver determination step of analyzing the extracted head area data and pre-registered driver's head area data by the driver area extraction step using a stored machine learning-based driver matching model, and determining whether there is matched data; and a driver recognition step of extracting unique information matched to the corresponding head area data when it is determined that there is the matched data according to a determination result of the driver determination step, and performing an automatic driver recognition func-tion using the extracted unique information, wherein the driver recognition step uses the extracted unique information to control a state of the vehicle according to the vehicle setting information previously received from the driver matching the unique informa-tion.

12. The driver recognition method of claim 11, wherein the data pre-processing step includes a first pre-processing step of extracting a predetermined number of anchor box areas set by the anchor box setting step for each data comprising the custom data set when a custom data set is selected.

13. The driver recognition method of claim 12, wherein the data pre-processing step further includes:

when the open data set is selected, performing:

a 2-1-th pre-processing step of detecting head area data for each data comprising the open data set by using the pre-stored object detection model;

a 2-2-th pre-processing step of randomly adjusting at least one of hue, saturation, brightness, and trans-parency of the head area data detected by the 2-1-th pre-processing step;

a 2-3-th pre-processing step of randomly receiving at least one image data of the first image data by the first image collection step, and positioning the head area data by the 2-2-th pre-processing step in the corresponding image data to generate a synthetic data set, and randomly positioning the head area data in region of interest coordinates set by the region of interest setting step; and a 2-4-th pre-processing step of extracting the predeter-mined number of anchor box areas set by the anchor box setting step for each data comprising the syn-thetic data set.

14. The driver recognition method of claim 13, further comprising:

prior to performing the driver determination step, in order to store a machine learning-based driver matching model, performing:

a feature pre-processing step of analyzing, in advance, a custom data set generated by the custom data generation step and a synthetic data set generated by the 2-3-th pre-processing step by using the object detection model generated by the first learning pro-cessing step to extract face area data from each image data, and assigning the unique information to each extracted face area data;

a second learning processing step of inputting the face area data to which the unique information is assigned by the feature pre-processing step to a pre-stored classification network to perform learning processing;

a feature extraction step of using at least two feature extraction networks including a base network in which a learning result of the second learning processing step is reflected to input the face area data to which the unique information is assigned by the feature pre-processing step to any one selected feature extraction network and to input the face area data corresponding to the custom data set among the face area data to which the unique information is assigned by the feature pre-processing step to another feature extraction network, and extracting features from each network; and a third learning processing step of comparing the features of each face area data extracted by the feature extraction step by including a feature comparator layer connected to the two feature extraction networks to perform the learning processing of determining whether the features are identical, wherein a final layer comprising the base network of the classification network includes a global average pooling (GAP) layer, the final layer comprising the base network of the feature extraction network includes an adaptive average pooling (AAP) layer, and the driver matching model is generated as a learning processing result of the third learning process step.

15. The driver recognition method of claim 11, further comprising:

prior to performing, in advance, the driver determination step in order to register the driver's head area data, performing:

a registered driver collection step of acquiring registered driver image data of a registered driver, wherein the registered driver is a driver who wants to use a vehicle in which an automatic driver recognition function is set when the registered driver sits in the driver's seat of the vehicle;

a registered driver area extraction step of extracting the driver's head area data by analyzing the registered image data of the driver by the registered driver collection step using the object detection model generated by the first learning processing step;

a vehicle setting input unit of receiving desired vehicle setting information from the registered driver; and a registered driver management step of generating unique information for each driver who sits in the driver's seat of the vehicle, and matching the unique information generated for each driver who sits in the driver's seat of the vehicle, the head area data extracted by the registered driver area extraction step and the setting information received by the vehicle setting input step to store and manage the matched information, wherein, the registered driver collection step requests the registered driver to change a head angle for multiple repetitions of the registered driver collection step and acquires the registered driver image data of the registered driver while repeatedly performing the repetitions for a predetermined number of times.

16. A driver recognition method using a driver recognition system, comprising:

receiving, via a driver input unit, image data of a driver seated in a driver's seat in a vehicle in which an automatic driver recognition function of the driver recognition system is set;

extracting, via a driver area extraction unit, driver's head area data by analyzing the image data of the driver using a stored machine learning-based object detection model;

analyzing, via a driver determination unit, the extracted driver's head area data and registered driver's head area data using a stored machine learning-based driver matching model, determining whether there is matched data between the extracted driver's head area data and the register driver's head area data; and extracting, via a driver recognition unit, unique information matched to corresponding head area data when it is determined that there is matched data according to a determination result of the driver determination unit, and to perform an automatic driver recognition function using the extracted unique information, wherein the method further includes:

receiving a first image data set received from a first image collection unit configured to acquire the first image data set, which is first image data of a driver's seat, in a driverless situation, for each of a plurality of illumination conditions around the driver's seat controlled according to a predetermined condition, for each vehicle model for which the automatic driver recognition function is to be set in advance; and using the first image data set for generating the machine learning-based object detection model.

17. The driver recognition method of claim 16, further comprising performing an automatic driver recognition function, via the driver recognition unit, for controlling a state of the vehicle according to vehicle setting information previously received from the driver matching the unique information using the extracted unique information.

18. The driver recognition method of claim 16, further comprising:

selecting, via an input data selection unit, at least one data set from among an open data set and a stored custom data set;

performing a learning processing, via a first learning processing unit, to generate, store, and transmit the object detection model, based on the at least one data set, to the driver area extraction unit and to a second learning processing unit; and generating the learning-based driver matching model, via the second learning processing unit using the object detection model generated by the first learning processing unit, to provide to the driver determination unit to determine whether there is matched data between the extracted driver's head area data and the registered driver's head area data.

19. The driver recognition method of claim 16, wherein a learning data transfer for the driver recognition method, which includes generating and using the learning-based object detection model and the learning-based driver matching model, is based on an open-data set, pre-collected for the driver recognition method based on a probability, including a plurality of sample face images and labels for each of the sample face images, and on a custom data set for the vehicle acquired and stored by the driver recognition method.

* * * * *